(12) United States Patent
Samoilenko et al.

(10) Patent No.: US 8,525,427 B2
(45) Date of Patent: Sep. 3, 2013

(54) LIGHT-EMITTING DIODE LAMP

(76) Inventors: Iurii N. Samoilenko, Kiev (UA);
Valeriy S. Galuschak, Volgogradskaya Obl. (RU)

( * ) Notice: Subject to any disclaimer, the term of this patent is extended or adjusted under 35 U.S.C. 154(b) by 0 days.

(21) Appl. No.: 13/132,743

(22) PCT Filed: Feb. 27, 2009

(86) PCT No.: PCT/UA2009/000010
§ 371 (c)(1),
(2), (4) Date: Jul. 11, 2011

(87) PCT Pub. No.: WO2010/065005
PCT Pub. Date: Jun. 10, 2010

(65) Prior Publication Data
US 2011/0317405 A1    Dec. 29, 2011

(30) Foreign Application Priority Data
Dec. 5, 2008 (UA) .................. 200814044

(51) Int. Cl.
*H05B 37/00* (2006.01)
*H05B 37/02* (2006.01)

(52) U.S. Cl.
USPC ........ 315/207; 315/185 R; 315/192; 315/224; 315/291; 315/294

(58) Field of Classification Search
USPC ............. 315/185 R, 192, 207, 224, 291, 294
See application file for complete search history.

(56) References Cited

U.S. PATENT DOCUMENTS

| | | | | |
|---|---|---|---|---|
| 6,853,150 B2 * | 2/2005 | Clauberg et al. | ........... | 315/185 R |
| 7,847,487 B2 * | 12/2010 | Kato | .............................. | 315/192 |
| 2007/0024254 A1 * | 2/2007 | Radecker et al. | ............. | 323/247 |
| 2007/0069663 A1 * | 3/2007 | Burdalski et al. | ............. | 315/312 |
| 2010/0237800 A1 * | 9/2010 | Kang et al. | ..................... | 315/294 |

* cited by examiner

*Primary Examiner* — Douglas W Owens
*Assistant Examiner* — Thai Pham
(74) *Attorney, Agent, or Firm* — Weiner & Burt, P.C.; Irving M. Weiner; Pamela S. Burt

(57) ABSTRACT

The invention relates to electric lighting facilities powered from an external electrical network. The light-emitting diode lamp comprises a step-down voltage converter (1) made up of a chain of capacitors (2, 3, 4) connected in series, one of which is a power take-off capacitor (3) and is connected to at least one pair (5) of inverse-parallel connected light-emitting diodes (6, 7). The invention makes it possible to achieve extremely low electrical energy consumption for lighting, ensure optimum performance, and use the circuit for the additional function of supplying power to external users of, for example, mobile telephones.

6 Claims, 3 Drawing Sheets

LIGHT-EMITTING DIODE LAMP

FIELD OF THE INVENTION

The invention relates to light sources and particularly deals with light-emitting diode (LED) lamps which can be used for both outdoor and indoor lighting and have ultra-low active energy consumption.

BACKGROUND OF THE INVENTION

Light-emitting diode lamps with white light-emitting diodes embedded within a single housing are known from the background art (RU,2234638,C1).

Such an LED source is disadvantageous in that its illuminator has to be constantly shaken.

There is also a lamp powered from solar energy, comprising a panel with photovoltaic cells, an electric storage battery, a lighting unit and a control unit, characterised in that it consists of a single modular housing comprising a panel with photovoltaic cells, an electric storage battery, a control unit and a lighting unit made as a CCD array, all mounted under a translucent cover (RU,36478, U1).

A disadvantage in using this lamp is that it can not be exploited indoors.

There is also a solution offering a light source for lighting various surfaces and also for creating decorative luminous effects. A light-emitting diode illuminator comprises a rack, mounting elements, electroconductive wires and a light source, consisting of light-emitting diodes. It is characterised in that the panel is made in the form of a flat disk with petals which resembles epicycloids, wherein the number of branches (petals) m is in the range of m>3. The light-emitting diodes are divided into primary and secondary diodes. The primary light-emitting diodes are mounted on the front surface of the panel so that their luminous fluxes are directed primarily towards the surface being lit. The secondary light-emitting diodes are mounted on the back surface of the panel, and their luminous fluxes are primarily directed towards the side opposite to the direction of luminous fluxes from primary light-emitting diodes. Each petal comprises a mechanism allowing changing the position of a petal by rotating it around the axis going though the centre of the disk and the symmetry axis of the petal. Fastening elements comprise electroconductive wires, and the disk has an internal opening (RU, 2285860, C1).

Such a light source is disadvantageous due to significant electricity consumption.

RU, 2329619,C1 discloses a light-emitting diode lamp which can be used for lighting reading rooms, libraries, book depositories, etc. and which, according to one aspect of the invention, comprises a voltage down-converter connected to at least one light-emitting diode through a diode bridge and an energy supply control element. This lamp further comprises a capacitor filter included between the diode bridge and the light-emitting diode and in parallel to them, the voltage down-converter being made of at least one conjugate shunt resistor and at least one capacitor, as well as one current-limiting resistor.

A disadvantage of this device is considerable electric energy consumption a part of which is lost in the shunt resistor.

The problem solved by the invention is to develop a light-emitting diode lamp which, due to avoidance of considerable coil resistance, makes it possible to provide lighting with ultra-low active electric energy consumption.

SUMMARY OF INVENTION

The said problem is solved by a light-emitting diode lamp according to the invention, comprising a voltage down-converter electrically connected with light-emitting diodes and used to maintain their power supply level, the voltage down-converter being made up of a chain of capacitors connected in series, one of which is a power take-off capacitor, and each pair of light-emitting diodes is connected in parallel opposition and is connected to the power take-off capacitor.

The proposed technical solution allows to ensure highly efficient performance of a light-emitting diode lamp due to removal of a diode bridge, as well as a shunt resistor and current-limiting resistor from the circuit in the voltage down-converter, which results in the reduction of consumption of active power.

According to one preferred embodiment of the light-emitting diode lamp according to the invention, in order to discharge collected charge in the circuit capacitors, a discharge resistor is installed at the input of the voltage down-converter, and in order to limit current flowing through the light-emitting diodes, current-limiting resistors can be further mounted before and after the power take-off capacitor.

Furthermore, the light-emitting diode lamp according to this embodiment can further comprise a bridge rectifier with a capacitor filter and a general purpose connector, connected in parallel to the light-emitting diodes via an interlocked switch.

According to yet another proposed embodiment, in order to protect the light-emitting diodes from switching surges and overvoltages resulting from voltage fluctuation in the power network, reference diodes connected in series and in opposite directions should be installed in parallel to the light-emitting diodes.

BRIEF DESCRIPTION OF THE DRAWINGS

The invention is further described in more details with reference to the accompanying drawings where.

BEST MODE FOR CARRYING OUT THE INVENTION

Figure 1:
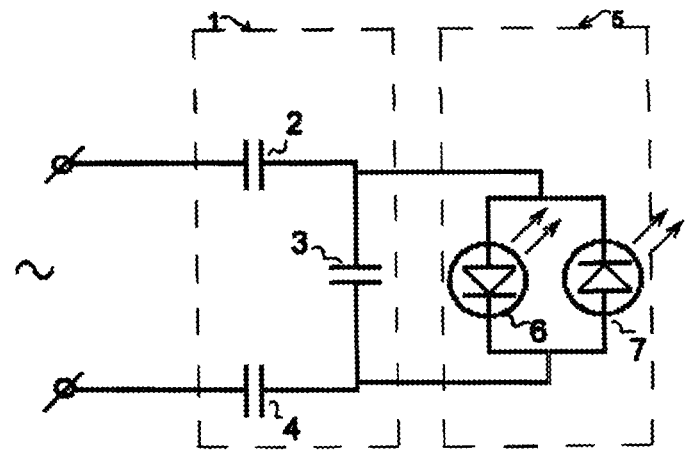
FIG. 1 is a diagram of the light-emitting diode lamp according to the invention.

As shown in FIG. 1, the light-emitting diode lamp according to the invention comprises a voltage down-converter 1 which, according to the invention, is made up of a chain of capacitors 2, 3, 4 connected in series, one of which is a power take-off capacitor (the power take-off capacitor is marked with reference number 3 on the drawings 3).

The light-emitting diode lamp according to the invention comprises at least one pair 5 of light-emitting diodes 6, 7 installed in parallel opposition and connected to the power take-off capacitor 3. The number of pairs 5 of light diodes in the lamp is chosen depending on the conditions in which a respective level of lighting needs to be achieved.

Figure 2:
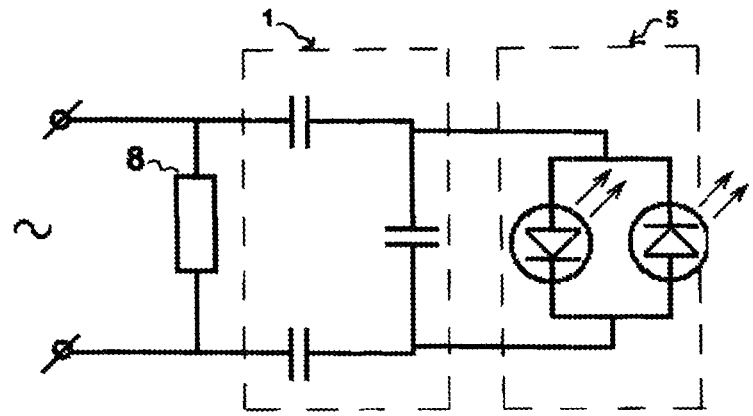
FIG. 2 is a diagram of one aspect of the invention providing for the use of a discharge resistor.

In order to discharge collected charge in the capacitors 2, 3, 4, according to one preferred embodiment, a resistor 8 can be installed at the input of the voltage converter 1 as shown in FIG. 2. The rated resistance of the resistor 8 is set in the range from ones to tens of mOhm.

At the same time, according to yet another embodiment, along with discharging collected charges the light-emitting diode lamp according to the invention provides for limitation of the current flowing through the light-emitting diodes 6,7 due to current-limiting resistors 9,10 (FIG. 3) included in the chain of capacitors 2,3,4 before and after the capacitor 3. The rated resistance in the resistors 9, 10 may be in the range from ones to tens mOhm.

Figure 4:
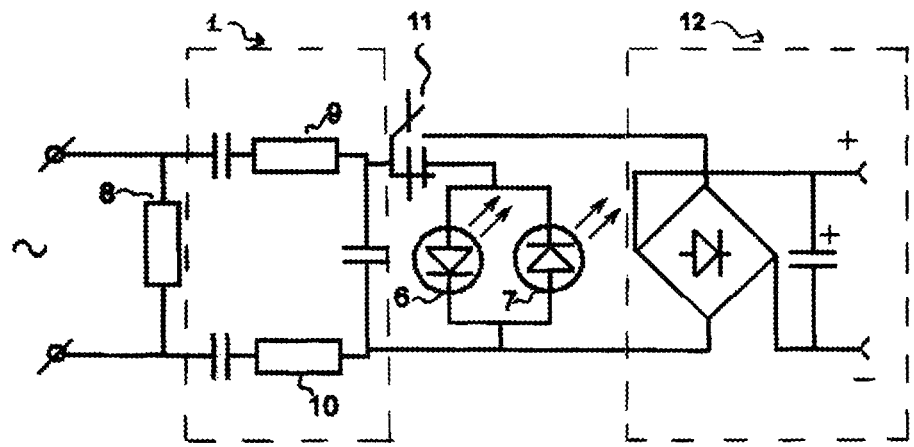
FIG. 4 is a diagram of yet another aspect of the invention providing for the use of a bridge rectifier, comprising a capacitor filter and a general purpose connector with an interlocking switch.

As shown in FIG. 4, additional connection of a bridge rectifier 12 with a capacitor filter and a general purpose connector in parallel to the light-emitting diodes 6,7 via an interlocked switch 11 allows to expand performance capabilities of the lamp according to the invention, particularly to output rectified current to the general purpose connector of the bridge 12 to plug-in outside using equipment, for example a mobile phone.

Figure 5:
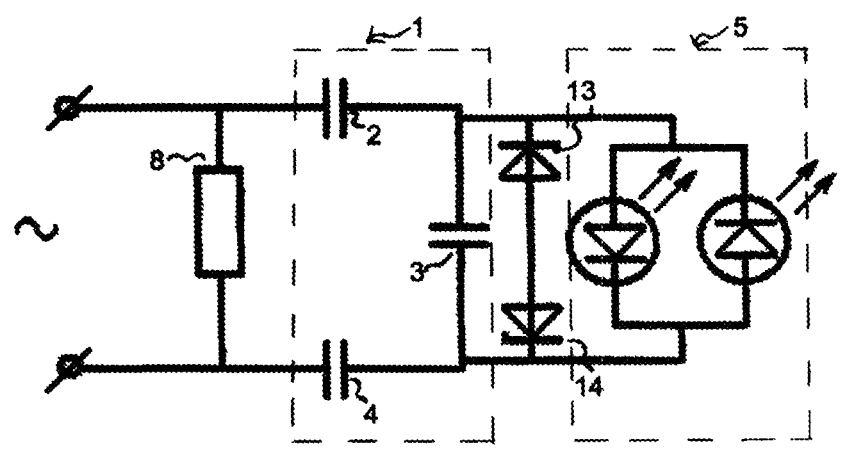
FIG. 5 is a diagram of the light-emitting diode lamp comprising reference diodes for protection against overvoltages.

In order to protect the light-emitting diodes 5, 6 from switching surges and overvoltages resulting from voltage fluctuation in the power network, according to yet another embodiment of the claimed lamp, two reference diodes 13, 14 (FIG. 5) connected in series and in opposite directions are installed in parallel to the light-emitting diodes. Persons skilled in the art will understand that protection of the light-emitting diodes 5,6 will also be provided when the reference diodes 13, 14 are included in the circuit shown in FIG. 1. The rated stabilizing voltage of reference diodes Ust must not be more than 50% higher than the value of rated operation voltage of the light-emitting diodes.

Figure 3:
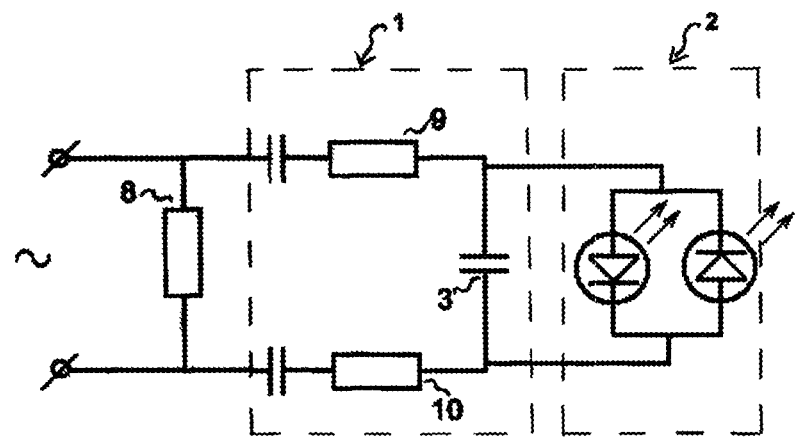
FIG. 3 is a diagram of yet another aspect of the invention providing for the use of current-limiting resistors.

When supply-line voltage is fed, the capacitors 2,3,4 (FIG. 1) divide it inversely proportional to their capacities, while the capacitor 3, which is a power take-off capacitor, forms operation voltage to power the pair 5 of the light-emitting diodes 6,7 which, when flashing, light the surrounding area. When the lamp is plugged off the power line, the charge collected in the capacitors 2,3,4 is discharged via the resistor 8 (FIG. 2), which ensures safe operation of the lamp during its removal from a socket. Possible overvoltage impulses in the light-emitting diodes 6,7 upon switching on and switching off the light-emitting diode lamp are smoothed by the resistors 9 and 10 and the capacitor 3 (FIG. 3).

In order to supply power to external users, the interlocked switch 11 is switched over to supply power to the bridge rectifier. At the same time, the light-emitting diodes 6, 7 are disconnected from power and the light goes down. The capacitor filter of the bridge 12 smoothes ripples of rectified current which is directed to its general purpose connector in order to connect external users (for example, mobile phones).

During switching on and switching off the lamp, as well as upon voltage fluctuation in the power line, an emerging high voltage impulse in the chain of the light-emitting diodes 6, 7 is higher than the stabilizing voltage Ust of the reference diodes 13, 14 (FIG. 5), the reference diodes 13, 14 open and shunt the light-emitting diodes 6, 7 by passing high voltage current through them upon the transit of a high voltage impulse. When the voltage becomes lower than Ust, the reference diodes close, the operation voltage is supplied to the light-emitting diodes 6, 7, which are powered and when flashing light the surrounding area.

Thus, the proposed embodiments of the light-emitting diode lamp according to the invention, being easy in manufacture, allow to ensure ultra low consumption of active electric energy for lighting and, at the same time, efficient operation of the lamp according to the invention, which provides for the discharge of the collected charge in the circuit capacitors, limiting the current passing through the light-emitting diodes, for a possibility to supply power to external users and for the protection of the light-emitting diodes from overvoltages, for example from switching surge voltages or those resulting from voltage fluctuation in a power line.

As a result, the use of the claimed light-emitting diode lamp as an outdoor and indoor lighting source powered from an external power supply network will allow to significantly cut on expenses covering consumed electricity.

The invention claimed is:

1. A light-emitting diode lamp, comprising:
    one or more pairs of light-emitting diodes;
    said light-emitting diodes of each said pair of light-emitting diodes being connected in parallel and in opposition to each other;
    a voltage down-converter electrically connected with said light-emitting diodes and used to maintain a power supply level of said light-emitting diodes;
    said voltage down-converter comprising a first capacitor, a second capacitor, and a third capacitor;
    said first, second and third capacitors being directly connected to each other;
    said first, second and third capacitors being connected in series to each other;
    said second capacitor functioning as a power take-off capacitor;
    a first terminal of said light-emitting diodes being electrically connected directed to a first junction of said first and second capacitors; and
    a second terminal of said light-emitting diodes being electrically connected directed to a second junction of said second and third capacitors.

2. The light-emitting diode lamp according to claim 1, including:
    a discharge resistor (8) connected at the input to the voltage down-converter (1);
    a first terminal of said discharge resistor being electrically connected directly to a first terminal of said first capacitor;
    a second terminal of said discharge resistor being electrically connected directly to first terminal of said third capacitor;
    said first junction of said first and second capacitors comprises a second terminal of said first capacitor and a first terminal of said second capacitor; and
    said second junction of said second and third capacitors comprises a second terminal of said second capacitor and a second terminal of said third capacitor.

3. The light-emitting diode lamp according to claim 2, including:
    first and second current-limiting resistors (9, 10) are mounted before and after the power take-off capacitor (3);
    said first current-limiting resistor is connected in series with said first capacitor and said second capacitor;
    said second current-limiting resistor is connected in series with said second capacitor and said third capacitor;
    said first current-limiting resistor is electrically connected directly between said second terminal of said first capacitor and said first terminal of said second capacitor; and said second current-limiting resistor is electrically connected directly between said second terminal of said second capacitor and said second terminal of said third capacitor.

4. The light-emitting diode lamp according to claim 3, including:
   an interlocked switch (11) electrically connected directly between said first terminal of said light-emitting diodes and said first terminal of said second capacitor;
   a bridge rectifier (12) with a capacitor filter and a general purpose connector, connected in parallel to the light-emitting diodes (6, 7) via said interlocked switch (11); and
   said bridge rectifier being electrically connected directly between said interlocked switch and said second terminal of said second capacitor.

5. The light-emitting diode lamp according to claim 2, characterized in that it further comprises reference diodes (13, 14), connected in series and in opposite directions, which are mounted in parallel to the light-emitting diodes (6, 7).

6. The light-emitting diode lamp according to claim 1, characterized in that it further comprises reference diodes (13, 14), connected in series and in opposite directions, which are mounted in parallel to the light-emitting diodes (6, 7).

* * * * *